United States Patent [19]

Pontius et al.

[11] Patent Number: 4,678,343

[45] Date of Patent: Jul. 7, 1987

[54] DEVICE FOR ATTACHING SOLES DIRECTLY TO UPPERS

[75] Inventors: Klaus Pontius, Hermeskeil; Manfred Settinger, Osburg; Lothar Oster, Achim-Uesen, all of Fed. Rep. of Germany

[73] Assignee: Klöckner Ferromatik Desma GmbH, Malterdingen, Fed. Rep. of Germany

[21] Appl. No.: 858,923

[22] Filed: May 2, 1986

[30] Foreign Application Priority Data

May 7, 1985 [DE] Fed. Rep. of Germany ....... 3516311

[51] Int. Cl.⁴ .................................................. B29B 1/10
[52] U.S. Cl. ......................................... 366/349; 366/78; 425/185; 425/186; 425/190
[58] Field of Search ................... 366/348, 349, 69, 79, 366/96, 97, 98, 99, 100, 76, 78; 425/182, 185, 186, 190; 12/1 A, 1 R

[56] References Cited

U.S. PATENT DOCUMENTS

| | | | |
|---|---|---|---|
| 3,233,288 | 2/1966 | Strauss | 425/190 |
| 3,386,131 | 6/1968 | Vanzo | 425/190 |
| 3,872,531 | 3/1975 | Torrents | 12/1 A |
| 4,575,328 | 3/1986 | Fierkens | 425/185 |
| 4,601,653 | 7/1986 | Inaba | 366/79 |

*Primary Examiner*—Robert W. Jenkins
*Attorney, Agent, or Firm*—Watson, Cole, Grindle & Watson

[57] ABSTRACT

A jet-molding unit device adapted to use in attaching soles directly to uppers. The device comprises a mixing head with a worm gear therein, the worm gear having an axis and being in a gear mounting, and a magazine adapted to retain a plurality of worm gears. The device further includes an automatic gripping device for gripping the worm gear in the gear mounting at a point removed from the mixing head, removing the worm gear from the gear mounting and depositing the worm gear in the magazine, and removing a second worm gear from the magazine and inserting it into the worm gear mounting.

17 Claims, 4 Drawing Figures

Fig.1
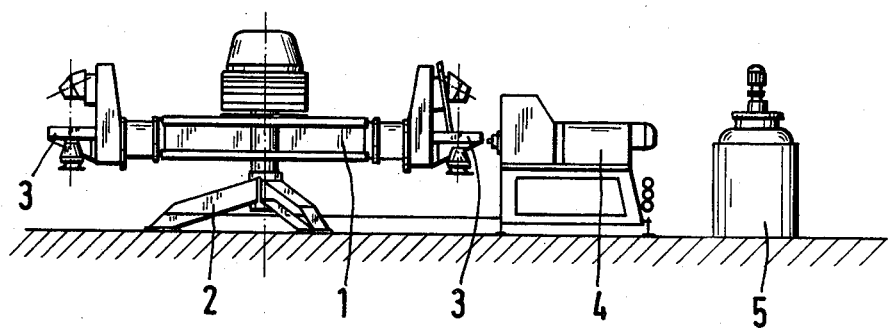
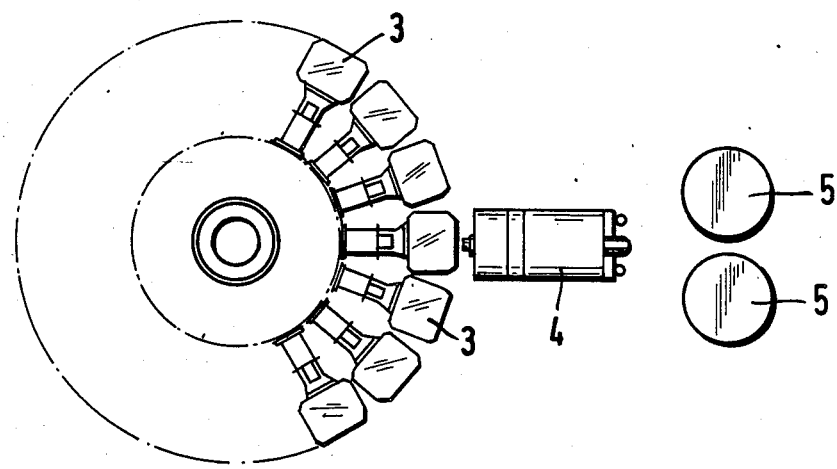
Fig.2

DEVICE FOR ATTACHING SOLES DIRECTLY TO UPPERS

BACKGROUND OF THE INVENTION

1. Field of the Invention

The present invention relates to a jet-molding unit adapted for use in attaching soles directly to uppers, the jet-molding unit having a mixing head equipped with a worm gear designed to be movable to enable automatic exchange of the worm gear by appropriate means.

2. The Prior Art

The shoe manufacturing industry generally defines the process of directly attaching soles to uppers as the automatic production of soles and the simultaneous attachment of the soles to the uppers. This procedure is suitably accomplished by jet molding. Materials used for forming the uppers can include, for example, leather, textiles, or synthetic polymeric substances and for the soles suitable materials include polyvinylchloride, nylon, polyurethane granulate, liquid components of polyurethane and thermoplastic rubbers. The materials used for the production of soles are generally injected into closed molds.

Devices for directly attaching soles to finished uppers are known in the art. Especially well known are turntable systems or so-called rotators which have, for example, eighteen molding stations installed on a work table and which, while rotating, are caused to move sequentially into the axis of the jet-molding unit which then moves to a molding point for jet molding the sole to the upper. For multi-colored soles or soles composed of more than one part, two jet-molding units are provided which are positioned about the periphery of the turntable and at an angle to one another.

The jet-molding unit is moved into the molding position by means of a conveying cylinder located in front of the jet-molding unit form. When the molding material from the molding channel can no longer flow back, the jet-molding unit is moved into its rearward position and, in a turntable system, the rotation of the turntable for another cyclical turn is then initiated.

A jet-molding unit comprises primarily a nozzle-type mouthpiece, a mixing head, a worm gear and pumps. The mixing head, in turn, comprises a casing and a worm gear with its worm gear mounting and worm gear bearings. The mixing head with worm gear mounting are fixedly attached in the jet-molding unit.

When processing liquid polyurethane, two components generally are used which are conveyed by means of a dosing pump. A separate valve is provided for each component on the mixing head. The two components are thoroughly mixed in a so-called mixing chamber in the mixing head by means of the worm gear. The mixing chamber is generally designed to be conical in front and cylindrical on the rear and the mixing worm gear has a corresponding shape. The worm gear rotates at about 15,000 to 18,000 rpm. The mixing gap between the external contour of the worm gear and the internal contour of the mixing chamber is adjustable in size from about 0.5 to 1.5 mm. The worm gear is subsequently adjusted horizontally in the mixing head so that the mixing gap is now reduced to be only 0.1 mm. The axial movement of the worm gear is caused by a worm gear thrust cylinder. Because of the high rpm ratio of the worm gear and because of the dynamic pressure which is created in the mixing chamber as a result of its conical shape, the components are thoroughly mixed inside the mixing chamber.

Thereafter, the component mixture is caused to move into the jet-molding form through the conveying effect of the worm gear. When the mixing process is completed, the valves close. The worm gear is self-cleaning in the cleansing position because of the strong centrifugal force.

The known, state-of-the-art jet-molding units, however, have the disadvantage of only permitting a manual replacement of the worm gear, where the worm gear, after the mouthpiece is unscrewed, is removed from the front of the mixing head. When polyurethane (PUR) is used as injection material a replacement of the worm gear may be necessary every 1.5 to 2 hours since the threads of the worm gear become clogged which adversely affects the proper mixing of the components. Moreover, the manual replacement of the worm gear takes considerable time and also requires the presence of an operator which keeps this manual process from being cost effective. Furthermore, use of an auxiliary tool in removal could cause damage to the worm gear.

SUMMARY OF THE INVENTION

The present invention is thus directed to providing a device which can accomplish fully automatic replacement of worm gears. To this end, the device of the invention includes an automatic gripping device which grips the worm gear when it is farthest removed from the mixing head and removes it from the worm gear holding fixture or mounting, deposits the worm gear in a magazine, withdraws another worm gear from the magazine and inserts this second worm gear into the worm gear mounting.

The device of the invention has the advantage in that it is a fully automatic device for exchanging worm gears which results in considerable savings in time and costs. Moreover, the time required for changing a worm gear is a constant value and can, therefore, be precisely planned in manufacturing operations. This worm gear exchange device is an auxiliary mechanimm to the jet-molding unit, and thus can easily be integrated into the jet-molding unit by fitting it onto the base of the unit. This constitutes an important further advance toward the achievement of fully automated machines. The time interval required for an exchange of a worm gear can be an input into the control program of the machine. Thus the system can function at most for one minute in the interrupted-rhythm mode and then continue again with the fully automated production. This advantage becomes particularly apparent if one considers that a manual exchange of the worm gear can take as long as fifteen minutes.

The magazine of the device can be designed for the exchange of a plurality of worm gears, e.g., eight gears, so the magazine can be deposited before the beginning of a workshift and then removed again after the shift has ended.

By moving the worm gear out of the mixing head toward the rear into the interior space of the jet-molding unit, the worm gear can be removed and the mouthpiece no longer needs to be unscrewed as is the case during a conventional manual exchange of the worm gear.

An additional advantage results from the fact that the time interval between worm gears exchanges cannot be exceeded which guarantees a consistent quality of the jet-molded item. A further significant advantage results from the fact that the mixing of the components is improved since the worm gears are automatically exchanged in accordance with a planned cycle. The wear on the worm gears is uniform and thus the mixing conditions remain constant.

There is an additional, very important advantage realized in cleaning the mixing chamber. In a manual exchange of worm gears, the mixing chamber must be cleaned by hand with a reamer. With the present invention, cleaning is accomplished automatically with the aid of the worm gear as it enters the mixing chamber while rotating. The worm gear thereby loosens polyurethane residues adhering to the wall of the chamber and transports them out of the mixing chamber, so that the mixing chamber is cleansed as a result.

The subject invention is described in detail on the basis of one embodiment which is illustrated in the drawings. While this embodiment relates to a turntable system, it should be recognized that the concept of the invention is not, however, restricted to such systems.

BRIEF DESCRIPTION OF THE DRAWINGS

In the drawings,

FIG. 1 is a side view of a turntable type jet-molding system;

FIG. 2 is a corresponding top view;

DETAILED DESCRIPTION OF THE PREFERRED EMBODIMENTS

Figure 4:
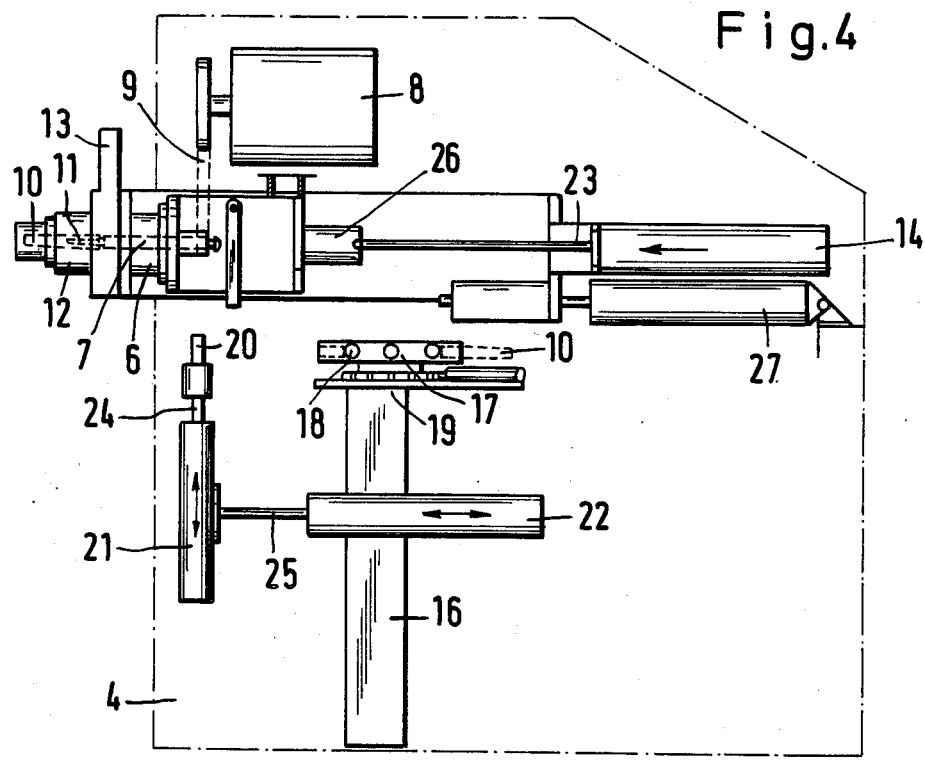
FIG. 4 is a schematic side view of a jet-molding unit of the invention where the worm gear is in the mixing position.

In FIG. 1, the system for forming soles directly on uppers in the manufacture of footwear comprises turntable 1 positioned on base 2 such that it can rotate. On the periphery of turntable 1 are individual molding points 3. Jet-molding unit 4 and material container 5 also form part of the system for molding soles.

FIG. 2 shows particularly clearly that turntable 1 has individual molding points 3 on its external perimeter. Such a turntable 1 may have, for instance, eighteen molding points 3. However, for simplicity, not all the molding points 3 are shown. The control console and the tempering system also are not illustrated. A material container station consists of two material containers 5 when polyurethane formed from two components is being molded. In case a third component is to be added, a third container (not shown) would also be provided.

Such a turntable type system generally has jet-molding unit 4. For multi-layered soles, two jet-molding units would be provided. The second unit, however, is then mounted similarly to jet-molding unit 4 shown in FIGS. 1 and 2.

Figure 3:
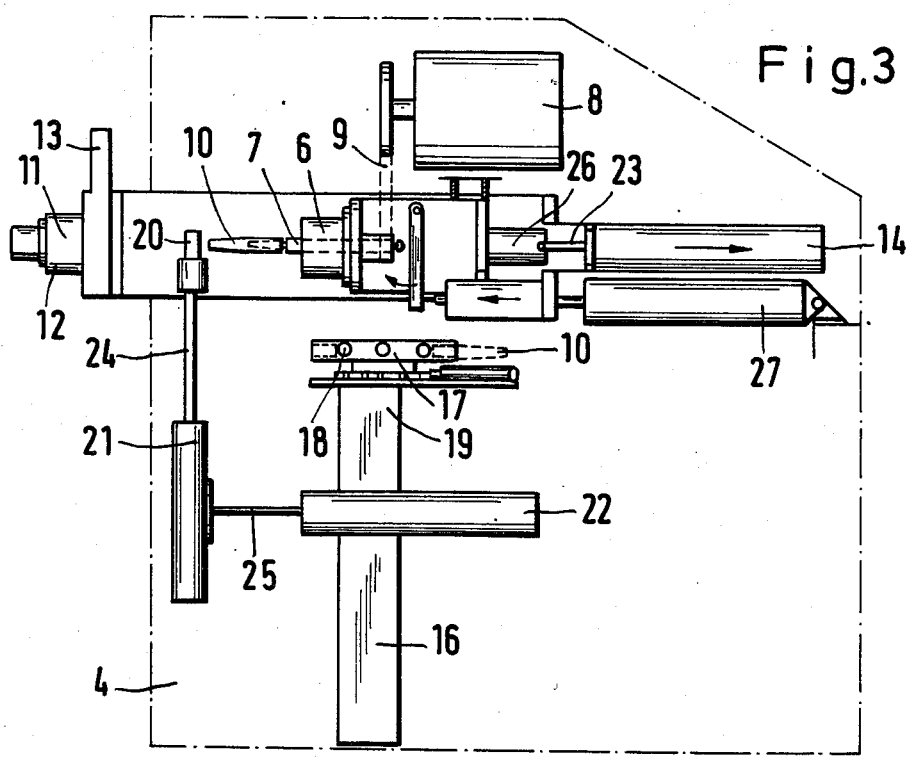
FIG. 3 is a schematic side view of a jet-molding unit according to the invention where the worm gear is shown in the return position for removal or insertion.

FIG. 3 is a side view of jet-molding unit 4 in the position in which it is lined up with the worm gear or in which the removal of the worm gear occurs. This is the extreme end position of the worm gear mounting or support 6. In worm gear mounting 6 is spindle 7 which is driven by motor 8, for instance, with belt drive 9. Worm gear 10 is attached to spindle 7. In the operating mode, worm gear 10 rotates at which time it consequently has to be moved to the left, inside a mixing chamber 11 located in mixing head 12. Valves 13 supply the components to mixing chamber 11.

Preferably, worm gear 10 is attached to spindle 7 by the hydraulic means disclosed in copending U.S. patent application of Lothar Oster entitled "Jet-Molding Unit for Use in Apparatus for Attaching Soles Directly to Uppers," the application being assigned to the same assignee as the subject application. This application is incorporated herein by reference in its entirety.

Attached to worm gear mounting 6 is feed cylinder 14 which adjusts worm gear mounting 6 to be either in this removal position as shown in FIG. 3, or in the mixing or jet-molding position as shown in FIG. 4.

On the base of jet-molding unit 4 is shaft 16 having attached magazine 17 for worm gears 10. Magazine 17 is in the form of a turret having recesses 18 on its circumference into which worm gears 10 are inserted radially. Magazine 17 can be rotated about vertical axis 19.

The moving of worm gears 10, as well as their insertion into worm gear mounting 6, their removal from this mounting, and also the insertion of the worms into magazine 17 and removal from the magazine are all accomplished with gripping device 20. Gripping device 20 may comprise clamping jaws openable and closeable by hydraulic or electrical controlling means. Gripping device 20 is moved vertically by lifting cylinder 21 to its two end positions, i.e., to a clamping or removal position of the worm gear (upper position) or to a magazine depository or magazine withdrawal position (lower position). Lifting cylinder 22 moves gripping device 20 horizontally to either the right or to the left. This movement is necessary to enable gripping device 20 to move worm gear 10 into the worm gear mounting position and into, or out of, magazine 17.

Magazine 17 is able to accept a plurality of, e.g, eight worm gears on its circumference. Magazine 17 may, for instance, have a stepper motor (not shown), so that the individual worm gears can be moved into position in sequence and so that the gripping device can remove or redeposit them.

The coupling of worm gear mounting 6 to lifting cylinder 14 is accomplished by piston rod 23 and piston rod 24 of lifting cylinder 21 is attached to gripping device 20. Piston rod 25 of lifting cylinder 22 accomplishes the axial movement of gripping device 20, particularly while worm gear 10 is being placed into, or moved out of, worm gear mounting 6 or when inserting worm gear 10 into, or out of, magazine 17.

Cleaning cylinder 26 moves worm gear 10 into the previously-described cleansing position in mixing chamber 11. Moving cylinder 27 moves the entire mixing unit in the molding position.

In operation of this embodiment in replacing worm gear 10, the worm gear is moved back to the worm gear mounting position (FIG. 3) and since mixing head 11 is rigidly attached, the worm gear can be removed in the space between the mixing head and the worm gear mounting 6. The concept of the invention is not, however, restricted to this embodiment since the possibility exists, and could easily be implemented, to attach the worm gear mounting rigidly to the jet-molding unit and to move the mixing head forward for the removal of the worm gear. It is merely important with the present invention that the worm gear is no longer pulled out of the front of the mixing head as the state of the art now requires, at which time the mouthpiece always has to be unscrewed in order to open the mixing chamber and remove the worm gear within it. It is important to the present invention to be able to have the worm gear a sufficient distance from the mixing chamber that one can grip the worm gear and remove it from the mounting or, vice versa, position a worm into the worm gear mounting during insertion.

To this end, one could also select a third approach which is to move both the mixing head as well as the worm gear mounting sufficiently apart that the worm gear exchange can be accomplished in the space created between the mixing head and the worm gear mounting. This embodiment, however, requires that both the mixing head as well as the worm gear mounting have a control and a drive.

The required distance between the mixing head and the worm gear mounting in all three possible embodiments in conformity to the inventive concept for effecting a change of worm gears depends largely on the length of the particular worm gear and can be easily determined. Furthermore, the exchange of worm gears can be done manually.

It is claimed:

1. A jet-molding unit device adapted for use in attaching soles directly to uppers, the device comprising a mixing head with a worm gear therein, the worm gear having an axis and being in a gear mounting, a magazine adapted to retain a plurality of worm gears, and an automatic gripping means for gripping the worm gear in the gear mounting at a point removed from the mixing head, removing the worm gear from the gear mounting and depositing the worm gear in the magazine, and removing a second worm gear from the magazine and inserting it into the worm gear mounting.

2. A device in accordance with claim 1, wherein the gripping means is vertically movable in relation to the axis of worm gear.

3. A device in accordance with claim 2, wherein the gripping means is movable in a vertical direction by a lifting cylinder.

4. A device in accordance with claim 1, wherein the gripping means is movable in the direction of the axis of worm gear.

5. A device in accordance with claim 4, wherein the gripping means is movable in a horizontal direction by a lifting cylinder.

6. A device in accordance with claim 1, wherein the mixing head and the worm gear are movable in relation to one another.

7. A device in accordance with claim 6, wherein the mixing head is fixed and the worm gear mounting is movable.

8. A device in accordance with claim 7, wherein the worm gear mounting is selectively movable.

9. A device in accordance with claim 1, wherein the magazine is a turret which has recesses on its circumference.

10. A device in accordance with claim 9, wherein the second worm gear in the magazine which is gripped by the gripping means is arranged co-axially to the axis of the worm gear when inserted in worm gear mounting.

11. A device in accordance with claim 1, wherein the magazine is on a shaft supported by a base.

12. A device in accordance with claim 1, wherein a cylinder for generating motion of the gripping device in the direction of the axis of worm gear is mounted on the shaft.

13. A device in accordance with claim 1, wherein the magazine is equipped with a stepper motor.

14. A device in accordance with claim 1, wherein the worm gear mounting is fixed and the mixing head is movable.

15. A device in accordance with claim 1, wherein the worm gear mounting as well as the mixing head are movable.

16. A device in accordance with claim 1, wherein the gripping means grips the threads of the worm gear.

17. A device in accordance with claim 1, wherein the magazine is detachable.

* * * * *